United States Patent [19]

Nabiullin

[11] 4,022,949
[45] May 10, 1977

[54] AIR-DEPOLARIZED CELL

[76] Inventor: Faat Khatovich Nabiullin, 3 Mytischinskaya ulitsa, 14a, kv. 90, Moscow, U.S.S.R.

[22] Filed: Dec. 17, 1975

[21] Appl. No.: 641,577

[30] Foreign Application Priority Data

Dec. 24, 1974 U.S.S.R. .......................... 2082914

[52] U.S. Cl. .................................. 429/28; 429/110
[51] Int. Cl.² .......................................... H01M 8/02
[58] Field of Search ......... 136/86 A, 86 R; 429/12, 429/110, 28

[56] References Cited

UNITED STATES PATENTS

| | | | |
|---|---|---|---|
| 3,698,956 | 10/1972 | Emoto et al. ...................... | 136/86 A |
| 3,920,475 | 11/1975 | Nabiullin .......................... | 136/86 A |

Primary Examiner—John H. Mack
Assistant Examiner—H. A. Feeley

[57] ABSTRACT

An air-depolarized cell comprises encased coaxially positioned positive and negative electrodes separated by an ion-conducting membrane, a corrugated perforated lead-out of the positive electrode, the mass of said positive electrode being pressed on the inner surface of said lead-out, and a lead-out of the negative electrode positioned in its axis plane with a separating bushing slipped thereon, an annular projection of said bushing being inserted into the material of the ion-conducting membrane, the lead-out of the negative electrode contacts a metal lid with holes covered by an insulating gasket and a sealing coupling fitted on the lead-out of the negative electrode.

3 Claims, 3 Drawing Figures

AIR-DEPOLARIZED CELL

This invention relates to chemical cells and, in particular, to air-depolarized cells.

The present invention may be employed as a self-contained current source for power supply of consumers' radio and electrical equipment: radio sets, flashlights, electrical watches, pocket calculators, etc.

There is known an air-depolarized cell comprising a case, coaxially arranged positive and negative electrodes divided by an ion-conducting membrane, a lead-out of the negative electrode which is in contact with a metal lid with holes, a pressurizing gasket with a sealing coupling made of plastic material, a bushing with an annular projection pressed into the material of the ion-conducting membrane. To allow the oxygen from the air to reach the positive electrode the latter is provided with vault-like shaped grooves positioned along the axis of the cell.

However, making the grooves in the positive electrode, particularly in miniature cells, is a fairly complicated process due to complicated tools involved and their low durability. Such an electrode is not strong and may be broken in the process of production and in further operation.

Moreover, in the process of production of the positive electrode the mass of the positive electrode soaked with alkali gets on the inner surface of the case edge (where the lid is fitted). In many cases this is the reason for alkali leakage from the cell case.

The same air-depolarized cell employs a positive electrode pressed into a metallic, e.g. steel perforated drum to strengthen the positive electrode and to let air oxygen have access thereto. Said perforated drum serves as a current lead-out and its edges are rolled and the outer surface is provided with projections running parallel to the drum axis.

Such construction of the positive electrode in the known air-depolarized cell ensures adequate rigidity, access of the air oxygen to the positive electrode and a reliable contact of the lead-out with the mass of the positive electrode.

However, production of such a drum is fairly complicated and leaves uncured one fundamental deficiency inherent in both forementioned constructions — fouling of the inner surface of the casing neck edge.

The mass of the positive electrode gets on the inner edge of the casing neck in the process of production of the positive electrode inside the casing or when the electrode is installed into the casing being produced outside.

Cleaning each casing is an effort-consuming task and utterly inacceptable in mass production. Moreover, the grooves in the positive electrode or groove-shaped gaps between the cell casing and the metallic perforated drum serving as a lead-out may be stopped or become narrower either in the process of production or in the process of operation. This may be due to the mass of the positive electrode getting therein or condensed electrolyte which may be squirting in the process of operation from the membrane gap when the volume of the negative electrode mass increases.

It is an object of this invention to provide an air-depolarized cell ensuring prevention of fouling of the inner edge of the casing neck in the process of making the positive electrode and its adequate rigidity.

Another object of this invention is to ensure uniform access of air oxygen to a positive electrode.

An object of this invention is to simplify production of a positive electrode lead-out.

This is achieved in an air-depolarized cell comprising encased coaxially mounted positive and negative electrodes divided by an ion-conducting membrane, a lead-out of the negative electrode positioned in its axis plane with a separating bushing slipped thereon, an annular projection of said bushing being inserted into the material of the ion-conducting membrane, the lead-out of the negative electrode being in contact with a metallic lid with holes covered by an insulating gasket and a sealing coupling fitted on the lead-out of the negative electrode, and a perforated lead-out of the positive electrode, the mass of said electrode being pressed onto its inner surface, wherein the lead-out of the positive electrode, is, according to the invention, made corrugated.

It is advisable that at least one groove is made on the corrugated lead-out of the positive electrode connecting the depressions formed by the crimps.

It is also advisable that each crimp of the leadout of the positive electrode is made so that the ratio between its pitch and height and thickness of the material amounts to 10:5:1.

The present invention ensures production of a positive electrode of an air-depolarized cell preventing the mass of the positive electrode from getting on the inner edge of the casing neck, adequate rigidity of the positive electrode and uniform access of air oxygen in needed amounts, simplifying at the same time the process of production of the positive electrode lead-out.

Other objects and advantages of this invention will become evident below with reference to a specific embodiment thereof and accompanying drawings, wherein.

Figure 1:
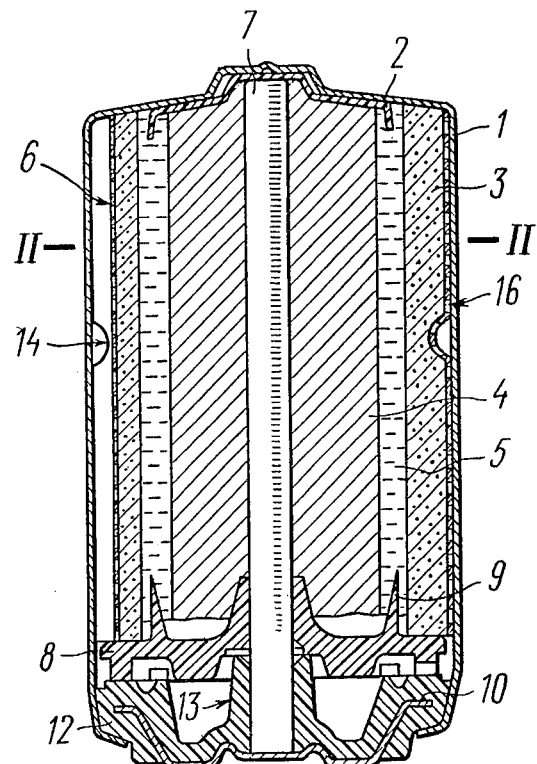
FIG. 1 is a cut-away of an air-depolarization cell, according to the invention.

An air-depolarization cell comprises a casing 1 (FIG. 1) containing an insulating gasket 2 and a coaxially positioned positive electrode 3 and a negative electrode 4 divided by an ion-conducting membrane 5. The positive electrode 3 is made by pressing the mass of the positive electrode onto the inner surface of a lead-out 6 which is corrugated and perforated. A lead-out 7 is placed in the center of the negative electrode 4 and a bushing 8 is slipped thereon. An annular projection 9 on said bushing presses into the material of the ion-conducting membrane 5 protecting the negative electrode 4 from the air oxygen. The casing 1 is covered by a metallic lid 10 with holes 11 shielded by a plastic material of a gasket 12 with a sealing coupling 13, said lid being in contact with the lead-out 7 of the negative electrode 4. A groove 14 is made on the outer side of the corrugated lead-out 6 of the positive electrode 3. Reference is made to my U.S. Pat. No. 3,920,475, column 4, lines 2–5 wherein cells such as shown in FIG. 1 of this application are activated by punching holes in gasket 12.

Figure 2:
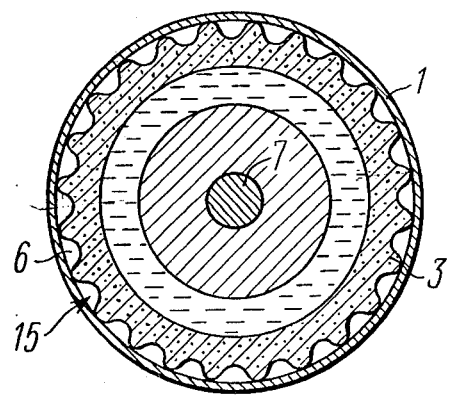
FIG. 2 is a view taken along line II—II of FIG. 1 according to the invention.

The groove 14 connects depressions 15 (FIG. 2) formed by the crimps of the lead-out 6 of the positive electrode 3.

Figure 3:
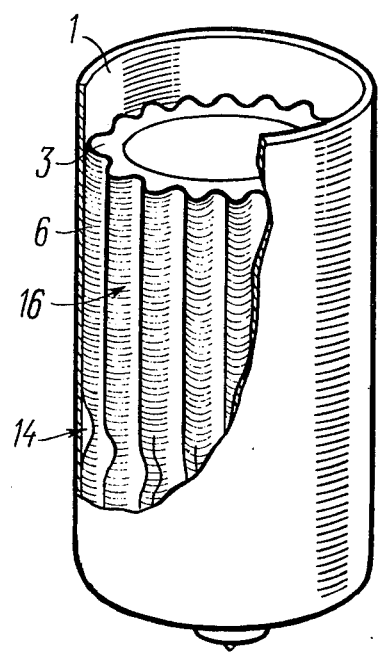
FIG. 3 shows a positive electrode lead-out, according to the invention.

Perforations 16 (FIG. 3) on the corrugated perforated lead-out (FIG. I) of the positive electrode 3 are made as slits.

The ratio of the pitch of each crimp of the lead-out 6 to the height of each crimp and to the thickness of the material from which the lead-out 6 is made is 10:5:1.

The thickness of the steel tape for the lead-out 6 depends on the size of the cell and ranges from 0.1 to 0.4 mm.

The perforations 16 made as slits are not more than 0.3 mm wide and positioned on top of the crimps and perpendicular thereto.

The present invention yields certain technological and economic effects. The structure of the lead-out 6 of the positive electrode 3 prevents fouling of the inner edge of the neck of the casing 1 and pouring-out of the electrolyte from the cell casing.

Besides, the positive electrode 3 is made within the casing 1 where the lead-out 6 is placed in advance. This eliminates assembly of the positive electrode in the casing 1.

The existing automatic machines producing tubular positive electrodes can be used and, consequently, no specialpurpose equipment is to be designed and manufactured.

What is claimed is:

1. An air-depolarization cell comprising: a casing with a bottom; a first insulating gasket placed on said bottom of said casing; a hollow open-ended corrugated perforated lead-out positioned coaxially inside and adjacent said casing; a positive electrode mass pressed on the inner surface of said corrugated perforated lead-out; a negative electrode coaxially arranged within said positive electrode on said first insulating gasket; an ion-conducting membrane coaxially positioned between said positive and negative electrodes; a lead-out of said negative electrode positioned in the center of said negative electrode; a bushing slipped on said lead-out of said negative electrode; an annular projection on said bushing inserted into the material of said ion-conducting membrane; a metal lid contacting said lead-out of said negative electrode and having holes providing access of air to said positive electrode; a second insulating gasket positioned around the edge of and under said metal lid; and a sealing coupling made integral with said second insulating gasket and fitted on said lead-out of said negative electrode.

2. The cell as claimed in claim 1 having at least one groove on the outer surface of said corrugated perforated lead-out of said positive electrode, which connects the depressions formed by the crimps of said corrugated perforated lead-out.

3. The cell as claimed in claim 1, wherein each crimp of said perforated corrugated lead-out of said positive electrode has the ratio of its pitch to its height and the thickness of the material from which said lead-out of said positive electrode is made of 10:5:1.

* * * * *